United States Patent [19]

Hata et al.

[11] Patent Number: 4,784,585
[45] Date of Patent: Nov. 15, 1988

[54] ELECTRIC AIR COMPRESSOR

[75] Inventors: Yasuhisa Hata, Akashi; Tikao Enokihata, Kobe, both of Japan

[73] Assignee: Nippon Air Brake Co., Ltd., Kobe, Japan

[21] Appl. No.: 69,995

[22] Filed: Jul. 6, 1987

[30] Foreign Application Priority Data

Jul. 17, 1986 [JP] Japan .................... 61-109485[U]

[51] Int. Cl.<sup>4</sup> ............................................. F04B 39/06
[52] U.S. Cl. ..................................... 417/372; 417/313; 417/415
[58] Field of Search ................... 105/1.3, 138, 139; 417/271, 415, 313, 372, 363

[56] References Cited

U.S. PATENT DOCUMENTS

| 3,918,850 | 11/1975 | Bridigum | 417/323 |
| 4,492,533 | 1/1985 | Tsuge | 417/415 |
| 4,696,626 | 9/1987 | Hata et al. | 417/313 |

Primary Examiner—Leonard E. Smith
Attorney, Agent, or Firm—J. O. Ray, Jr.

[57] ABSTRACT

The invention taught herein is for an electrically-operated air compressor unit in which the motor and the air compressor are hung under the floor of the railroad car perpendicular to the floor in series, so that the required space under the floor of the railroad car is only the space occupied by the motor, and the space of the air compressor can be eliminated.

2 Claims, 3 Drawing Sheets

U.S. Patent    Nov. 15, 1988    Sheet 1 of 3    4,784,585

ELECTRIC AIR COMPRESSOR

FIELD OF THE INVENTION

The present invention relates, in general, to electrically-powered air compressors and, more particularly, this invention relates to an electrically-operated air compressor for an air supply system of a railway car, and which can be secured to or suspended from such railway car beneath the floor thereof.

BACKGROUND OF THE INVENTION

Air compressors for use on railway cars are well known. For example, the prior art includes an apparatus described in Japanese Utility Model Application No. 60-17472, previously filed by the present applicants, and illustrated in FIGS. 3 and 4. As illustrated therein, the electromotive air compressor unit consists of the motor 3 and the air compressor 6. Both of these units are hung under the floor 2 of the railroad car by means of the hanger 5 in a manner such that they become parallel to the above-mentioned floor 2 and same shaft and, at the same time, they are coupled by means of the coupling 12 so that the torque of the motor 3 can be transferred to the air compressor 6. In addition, the air sucked in via the intake air filter and the intake muffler 27 is conducted into two low pressure cylinders 13 and is compressed, after which it is cooled by the intercooler 18 and it is distributed into two high-pressure cylinders 14 and compressed. Thereafter, the air is combined and conducted to the cooler located downstream, which is not shown in the FIGURES.

Generally, the underside of the floor of a railroad car of a modern transportation system, etc., is provided with numerous instruments and equipment, etc., so that space tends to be generally limited. Therefore, the miniaturization of the equipment and instrumentation installed under the floor or some other improvements to the installations have been desired.

However, when the motor and the air compressor are hung parallel to the floor, as can be seen in the above-mentioned example of the prior art of the electromotive air compressor, space is required for both the motor and the air compressor, which reduces the space available for the installation of the other equipment by that amount. In addition, in the radial reciprocating air compressor described in Japanese Patent No. 59-5797 and Japanese Patent Application No. 60-281563, the cylinder becomes head-low, so that the lubricant flows into the cylinder and it becomes unusable, all of which represent significant disadvantages.

SUMMARY OF THE INVENTION

The present invention teaches an electric air compressor unit for installation on a railroad car in which the motor is installed on the lower surface of the floor of the railroad car in a position that is perpendicular to this floor. This installation is accomplished by means of a hanger positioned so that the output shaft of the motor points downwardly, and the air compressor is connected to this motor so that the input shaft of the air compressor and the output shaft of the motor become the same shaft by means of a coupling.

OBJECTS OF THE INVENTION

It is, therefore, the primary object of the present invention to provide an electrically-operated air compressor for a railway car air supply system which can be mounted beneath the floor of such railway car and which utilizes a minimum of space.

Another object of the present invention is to provide an electrically-operated air compressor in which the motor and the air compressor units are mounted in series and form a single shaft by means of a coupling.

These and various other objects and advantages of the present invention will become more readily apparent to those persons skilled in the railroad air compressor art from the following more detailed description of the present invention, when such description is taken in conjunction with the attached drawings and with the appended claims.

BRIEF DESCRIPTION OF THE INVENTION

Figure 1:
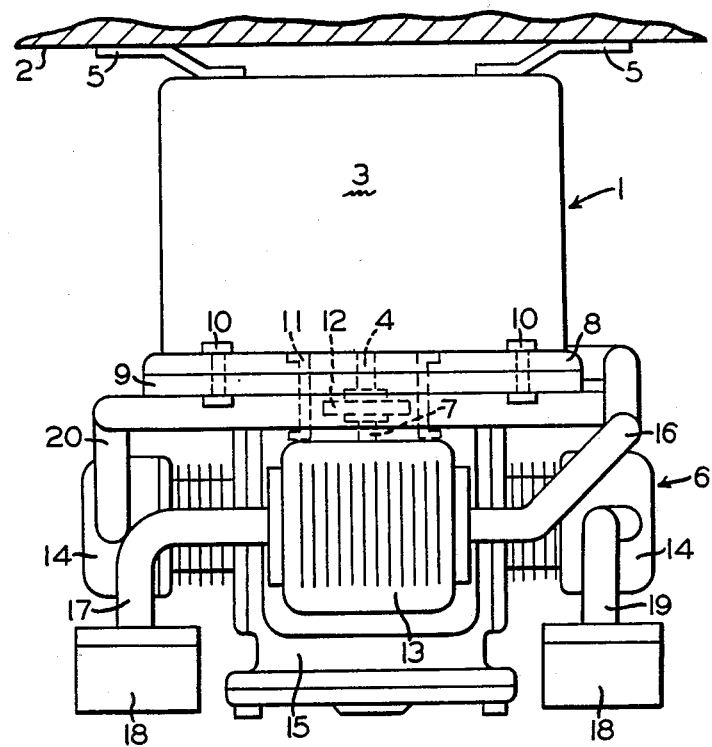
FIG. 1 is a schematic illustration of a front view of one presently preferred embodiment of the air compressor of the present invention.
Figure 2:
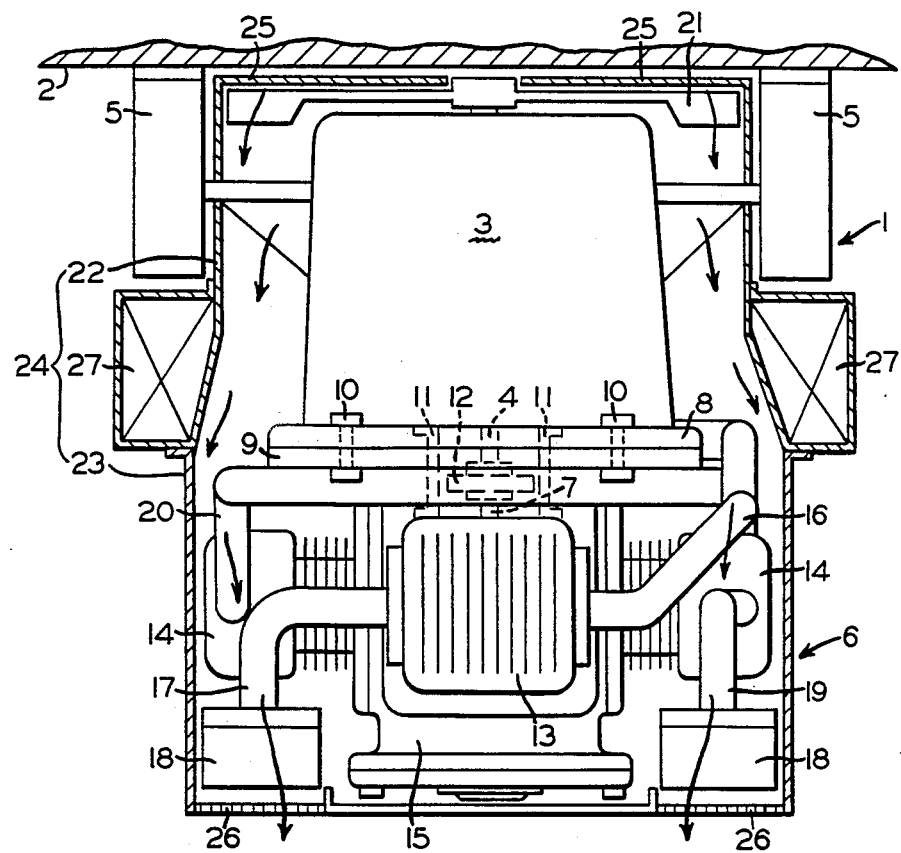
FIG. 2 is a schematic illustration of a front view of an alternative embodiment of the air compressor of the present invention.
Figure 3:
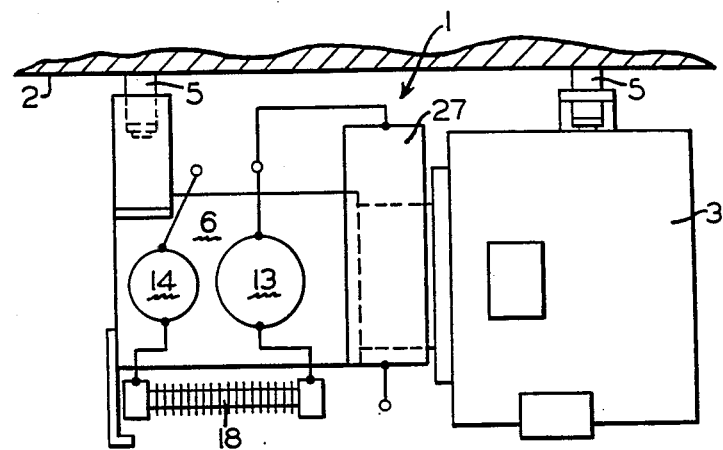
FIG. 3 is a schematic illustration of a front view of a prior art air compressor.
Figure 4:
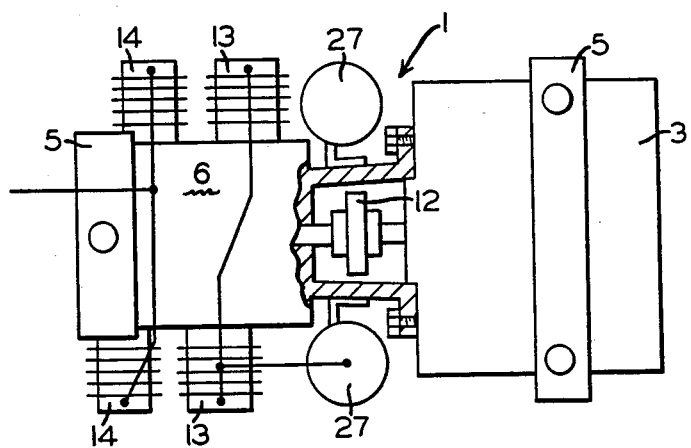
FIG. 4 is a plan view, partially in cross-section, of the prior art air compressor.

When referring to FIGS. 1 and 2 of the drawings, identical parts have been identified with identical numbers.

Now refer more particularly to FIG. 1 for an understanding of one presently preferred embodiment of an electrically-operated air compressor unit 1, which is constructed according to the present invention.

The electromotive air compressor unit 1 of this embodiment is of the natural cooling type, and it is hung on the lower surface of the floor 2 of the railroad car in a position which is perpendicular to the floor 2. In other words, the motor 2 is hung from the lower surface of the floor 2 by the hanger 5, with its output shaft 4 pointing downwardly and with the air compressor 6 installed below this motor 3. In order to install the air compressor 6 to the motor 3, the flange 8 of the motor 3 and the flange 9 of the air compressor 6 are connected by the connecting metal pieces 10 in such a way that the output shaft 4 of the motor 3 and the input shaft 7 of the air compressor 6 become a single shaft in the vertical direction and, in addition, the output shaft 4 of the motor 3 and the input shaft 7 of the air compressor 6 are connected by the coupling 12 and are surrounded by the middle hollow member 11.

The air compressor 6 is a radial compressor, and the low pressure cylinder 13 and the high pressure cylinder 14 extend alternately in parallel to the floor 2 radially or in the shape of a cross, and on the portion above the center part is the above-mentioned input shaft 7 and the oil sump 15 is in the portion below the center. In addition, the air passing through the air filter and the muffler (which are not indicated in the Figure) is sucked into the low-pressure cylinder 13 from the tubing 16 and it is compressed at a low pressure. The air is then sent into the high-pressure cylinder 14, passing through the tubing 17, the intercooler 18, and the tubing 19, and it is compressed at a high pressure and it is sent into the rear cooler (not indicated in the Figure) via the tubing 20.

This embodiment is described as a radial compressor, but the compressor can also be horizontal, horizontal opposed, V-type, W-type, etc.

The alternative embodiment is explained below with reference to FIG. 2. This alternative air compressor has forced cooling, and the difference from the above-mentioned air compressor of the first embodiment is that there is a fan 21 on the opposite side of the output shaft of the motor 3, and that there is a wind tunnel 24, consisting of the upper wind tunnel 22 and the lower wind tunnel 23. The lower wind tunnel 23 is attached to the upper wind tunnel 22 by means of bolts, etc., around the motor 3 and the air compressor 6, at a certain distance from them. The air inlet 25, from which the air enters the wind tunnel 24 by the rotation of the fan 21, is formed in the area near the lower surface of the floor 2 of the upper wind tunnel 22, around the motor 3. The air outlet 26 discharges the air forced into the wind tunnel 24 by the rotation of the fan 21, at a point which is a part of the lower wind tunnel 23, located in the lower portion of the air compressor 6, and which is below the intercooler 18, which is located in the side of the oil sump 15 and below the high-pressure cylinder 14. In addition, there is an extraction filter and an intake muffler 27 on the side of the upper wind tunnel 22, facing each other or in a ring shape.

It should also be noted that if the air delivery direction of the fan 21 is different, the air can enter from the outlet 26 and exit from the inlet 25. The difference in the operation of the electric air compressor unit 1 of the alternate embodiment from that of the first embodiment is that the air enters from the inlet 25 by means of the rotation of the fan 21, it absorbs the heat generated by the motor 3, the low-pressure cylinder 13, the intercooler 18, and the high-pressure cylinder 14, etc., and releases it to the outside while it passes through the space framed by the motor 3, the external shape of the air compressor 6, and the wind tunnel 24, and it is finally discharged from the air outlet 26. It can thereby be cooled, even when the car is stopped and the surrounding air does not move, and at the same time, to inspect the air compressor 6, all that is necessary is to remove the lower wind tunnel 23, which facilitates the operation. In addition, if soundproofing material is used for the wind tunnel 24, the noise can be reduced even further, which is also an advantage.

As is clear from the above description, with the electric air compressor unit for a railroad car according to this invention, the necessary space under the floor of the railroad car need only be the size of the motor, since the motor and the air compressor are hung in series under the floor of the railroad car perpendicular to the floor. Therefore, compared to the prior art, the space normally occupied by the compressor can be saved and used for hanging other machinery. In addition, by means of this invention, even if the compressor is a radial reciprocating compressor, since the oil sump is located in a lower place, the lubricant does not flow into the cylinder, so that it can be used effectively.

While a number of presently preferred embodiments of the electrically-operated air compressor of the present invention have been described in detail above, it should be obvious to those persons skilled in the railroad air compressor art that other modifications and adaptations can be made to the invention without departing from the spirit and scope of the appended claims.

We claim:

1. An electrically-operated, natural cooling-type air compressor unit connectable in a vertical position beneath the floor of a railway car, said air compressor unit comprising:
   (a) an electrically-operated motor including a flange member adjacent a lower surface of said motor;
   (b) an outwardly-extending output shaft connected to said motor in a position such that a longitudinal axis thereof extends substantially perpendicular to a lower surface of such floor of such railway car;
   (c) an air compressor including a flange member adjacent an upper surface of said air compressor;
   (d) bolt means engageable with each of said flange member on said motor and said flange member on said air compressor for connecting said air compressor to said motor;
   (e) an input shaft connected to said air compressor in a position such that a longitudinal axis thereof will be in substantial alignment with said longitudinal axis of said output shaft when said air compressor is connected to said motor;
   (f) a coupling means for connecting said output shaft of said motor with said input shaft of said air compressor; and
   (g) a mounting means connected to said motor for providing the sole mounting for said unit to such floor of such railway car.

2. An electrically-operated, forced cooling-type air compressor unit connectable in a vertical position beneath the floor of a railway car, said air compressor unit comprising:
   (a) an electrically-operated motor including a flange member adjacent a lower surface of said motor;
   (b) an outwardly-extending output shaft connected to said motor in a position such that a longitudinal axis thereof extends substantially perpendicular to a lower surface of such floor of such railway car;
   (c) an air compressor including a flange member adjacent an upper surface of said air compressor;
   (d) bolt means engageable with each of said flange member on said motor and said flange member on said air compressor for connecting said air compressor to said motor;
   (e) an input shaft connected to said air compressor in a position such that a longitudinal axis thereof will be in substantial alignment with said longitudinal axis of said output shaft when said air compressor is connected to said motor;
   (f) a coupling means for connecting said output shaft of said motor with said input shaft of said air compressor;
   (g) a mounting means connected to said motor for mounting said unit to such floor of such railway car;
   (h) a wind tunnel substantially surrounding said motor and said air compressor for cooling said motor and said air compressor, said wind tunnel including an air inlet and an air outlet; and
   (i) a blower means mounted within said wind tunnel for moving a predetermined amount of air into and out of said wind tunnel.

* * * * *

UNITED STATES PATENT AND TRADEMARK OFFICE
CERTIFICATE OF CORRECTION

PATENT NO. : 4,784,585
DATED : November 15, 1988
INVENTOR(S) : Yasuhisa Hata & Tikao Enokihata It is certified that error appears in the above-identified patent and that said Letters Patent are hereby corrected as shown below:

Column 4, line 56, before "mounting" insert

--providing the sole-- same line, after "mounting" insert --for--

Signed and Sealed this

Twenty-eighth Day of March, 1989

Attest:

DONALD J. QUIGG

Attesting Officer

Commissioner of Patents and Trademarks